(12) United States Patent
Siri

(10) Patent No.: US 8,351,229 B2
(45) Date of Patent: Jan. 8, 2013

(54) CURRENT SHARING POWER SYSTEM

(75) Inventor: Kasemsan Siri, Torrance, CA (US)

(73) Assignee: The Aerospace Corporation, El Segundo, CA (US)

( * ) Notice: Subject to any disclaimer, the term of this patent is extended or adjusted under 35 U.S.C. 154(b) by 367 days.

(21) Appl. No.: 12/731,140

(22) Filed: Mar. 24, 2010

(65) Prior Publication Data

US 2011/0235379 A1 Sep. 29, 2011

(51) Int. Cl.
*H02M 7/00* (2006.01)

(52) U.S. Cl. .......................................... 363/65

(58) Field of Classification Search ............ 363/65–72, 363/79, 80, 98, 132; 307/52, 53, 58, 82, 307/87
See application file for complete search history.

(56) References Cited

U.S. PATENT DOCUMENTS

| | | | | |
|---|---|---|---|---|
| 4,276,590 A * | 6/1981 | Hansel et al. | | 363/71 |
| 4,734,844 A * | 3/1988 | Rhoads | | 363/72 |
| 5,691,627 A * | 11/1997 | Shum | | 323/222 |
| 6,154,381 A * | 11/2000 | Kajouke et al. | | 363/65 |
| 6,574,124 B2 * | 6/2003 | Lin et al. | | 363/65 |
| 6,801,026 B2 * | 10/2004 | Schrom et al. | | 323/272 |
| 6,894,466 B2 * | 5/2005 | Huang et al. | | 323/272 |
| 6,903,946 B1 * | 6/2005 | Wu | | 363/65 |
| 7,038,924 B2 * | 5/2006 | Wu | | 363/89 |
| 7,368,959 B1 * | 5/2008 | Xu et al. | | 327/141 |
| 7,466,116 B2 * | 12/2008 | Sato et al. | | 323/285 |
| 7,715,215 B1 * | 5/2010 | Bosco et al. | | 363/67 |
| 7,773,395 B2 * | 8/2010 | Siri | | 363/65 |
| 2003/0048648 A1 * | 3/2003 | Lin et al. | | 363/65 |
| 2006/0239046 A1 * | 10/2006 | Zane et al. | | 363/65 |
| 2008/0197825 A1 | 8/2008 | Siri | | |

* cited by examiner

*Primary Examiner* — Adolf Berhane
(74) *Attorney, Agent, or Firm* — Paul D. Chancellor; Ocean Law (57) ABSTRACT

A power system controller includes multiple channels and each channel has a current sharing controller that is coupled to a shared current signal bus and a shared voltage signal bus.

13 Claims, 12 Drawing Sheets

CURRENT SHARING POWER SYSTEM

STATEMENT OF GOVERNMENT INTEREST

The invention was made with Government support under contract No. FA8802-04-C-0001 by the Department of the Air Force. The Government has certain rights in the invention.

REFERENCE TO RELATED APPLICATIONS

The present application is related to applicant's copending applications, U.S. patent application Ser. No. 12/378,857 filed Feb. 20, 2009 and U.S. patent application Ser. No. 11/713,826 filed Feb. 21, 2007.

INCORPORATION BY REFERENCE

This application incorporates U.S. patent application Ser. No. 12/378,857 filed Feb. 20, 2009 in its entirety and for all purposes. In particular, the disclosures relating to FIG. 4 including pages 16-21 of the patent application concerning the output voltage regulator and the current sharing controller are incorporated.

BACKGROUND OF THE INVENTION

1. Field of the Invention

The invention relates to the field of power systems. More particularly, the present invention relates to a power system having multiple channels and means for balancing channel currents.

2. Discussion of the Related Art

Isolated AC-to-DC power systems with active power factor correction (APFC) have been used in several applications involving active power factor correction for drawing sinusoidal currents from utility grids or input AC power sources, and regulation of DC output voltages being isolated from the grid or the input power sources. Without active current sharing, parallel connection of these identical power systems, respectively at their AC inputs and DC outputs, is not feasible as a result of far from uniform current-sharing among the paralleled power channels.

When parallel-connected, only one or a few power channels have a dominant power contribution while the remaining power channels are idle or make small contributions to the common output load. In many cases, the over-subscribed power channels have increased unreliability and shortened lifetimes due to, inter alfa, persistent thermal overstresses.

The parallel-connection disability discourages the application of the existing low-power AC-to-DC converter systems for large loads having demands exceeding the power rating of individual AC-to-DC power systems. Consequently, conventionally designed AC-to-DC power systems are not typically ganged together to supply large loads. Instead, a newly designed stand-alone APFC and converter power stage suited to the higher power demand is the typical solution. In other words, incremental power expansion is not feasible with conventional AC-to-DC power systems supplying a common load that grows to exceed the capacity of the original power system.

SUMMARY OF THE INVENTION

The present invention offers, in various embodiments, one or more improvements over the prior art. These include current-sharing control approaches and similar improvements discussed below.

In an example a power system controller includes multiple channels and each channel has a current sharing controller that is coupled to a shared current signal bus and a shared voltage signal bus. As a consequence of multiple current sharing controllers with the two commonly shared buses, multiple power channels of an AC-to-DC converter power system with active power factor correction can be parallel connected to achieve uniform power sharing and input/output electrical isolation without conflicts in the system output voltage regulation. The parallel connected source or independent AC power sources may possess different frequencies, phases, and voltages.

In an example, current-sharing control approaches are blended with existing control of back-end commercial-off-the-shelf ("COTS") converters. Here, the converter outputs are parallel connected across a common load and uniform current sharing among the channel-output currents is achieved while maintaining output voltage regulation performance. These control approaches are also applicable to distributed AC power sources, each of which is independently connected to the input of the respective AC-to-DC power channel, resulting in multiple channels of distributed AC-to-DC power systems that equally share their power flows into the same load.

In an embodiment, an electric power system balances output currents of a plurality of power channels serving a common load. Here, the electric power system comprises a plurality of power channels, each power channel including a front-end AC-to-DC converter with active power factor control coupled to a back-end isolated DC-to-DC converter via a DC-link, a PWM modulator interconnected with the DC-to-DC converter, a current sensor operable to provide a sensed current signal derived from a DC-to-DC converter output, a voltage regulator operable to provide a voltage error signal derived from the DC-to-DC converter output, and a current sharing controller. Each DC-to-DC converter output is connected in parallel across a common load. A voltage signal bus is shared by each of the current sharing controllers and the bus operable to share a dominant reference voltage signal derived from a selected voltage error signal. A current signal bus is shared by each of the current sharing controllers and the bus is operable to share a reference current signal derived from the sensed current signals of the current sharing controllers. A current error signal is derived from the sensed current signal and the reference current signal and each current sharing controller has an output derived from the current error signal and the dominant reference voltage signal, the output being coupled to a respective PWM modulator by an electrically isolated signal path.

BRIEF DESCRIPTION OF THE DRAWINGS

Embodiments of the present invention are described herein with reference to the accompanying figures. The figures form part of the specification and together with it are intended to provide illustrative examples of the invention sufficient to enable a person of ordinary skill in the relevant art to make and use the invention.

DETAILED DESCRIPTION OF THE INVENTION

The disclosure provided in the following pages describes examples of some embodiments of the invention. The designs, figures, and description are non-limiting examples of embodiments of the invention. For example, other embodiments of the disclosed systems and methods may or may not include the features described herein. Moreover, disclosed advantages and benefits may apply to only certain embodiments of the invention and should be not used to limit the disclosed inventions.

Figure 1:
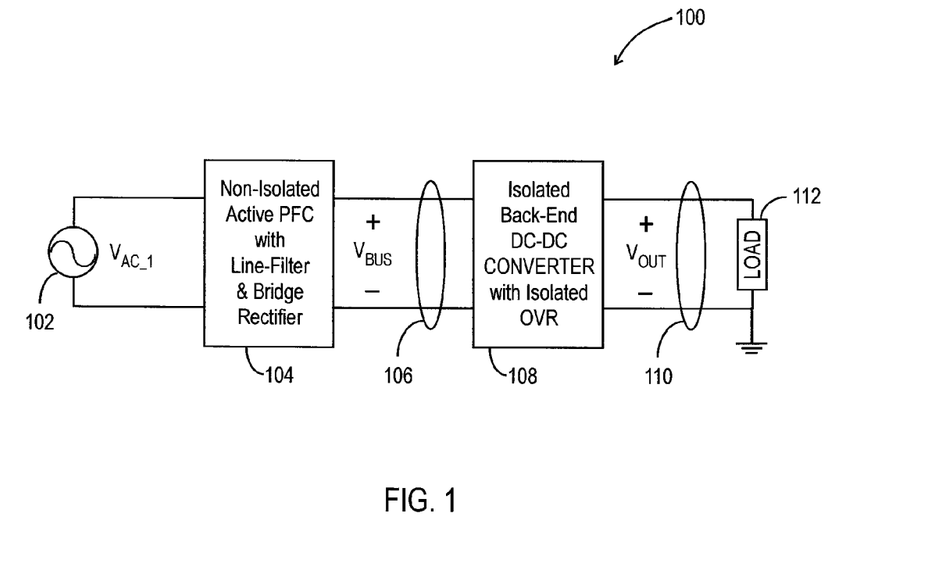
FIG. 1 shows a block diagram of a prior art stand-alone AC-to-DC power channel.

FIG. 1 shows a stand-alone AC-to-DC power system 100. The power system comprises a front-end AC-to-DC converter 104 serving as a non-isolated APFC and an isolated back-end DC-to-DC converter 108 with independent output voltage regulation. The AC input voltage 102 is typically 110 VAC at 60 HZ or 220 VAC at 50 Hz. The DC-link voltage Vbus 106 has a value appropriate for the application such as a range from 300V to 400 V depending on the APFC power stage and controller design. The output voltage $V_{OUT}$ 110 is electrically isolated from the DC-link voltage and regulated as required, for example to a significantly lower or higher voltage than the DC-link voltage. The output voltage $V_{OUT}$ is across a load 112.

Figure 2A:
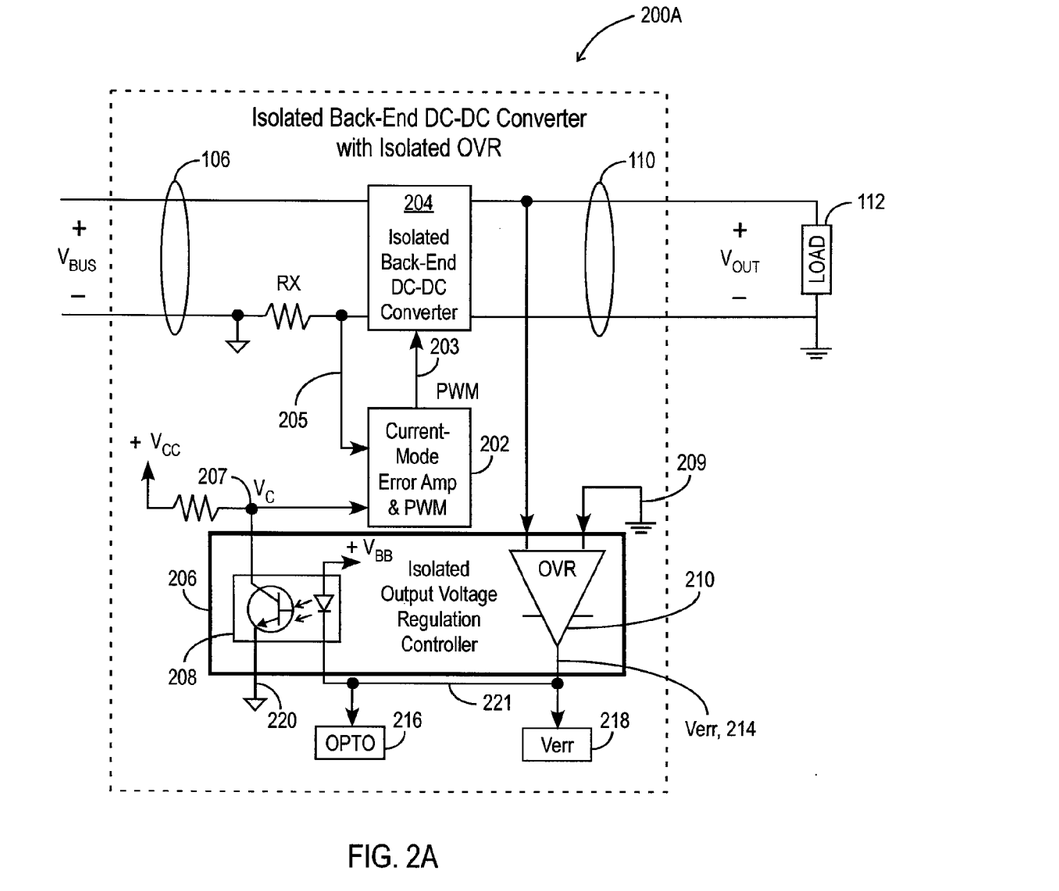
FIGS. 2A-B show block diagrams of prior art back-end converters.
Figure 2B:
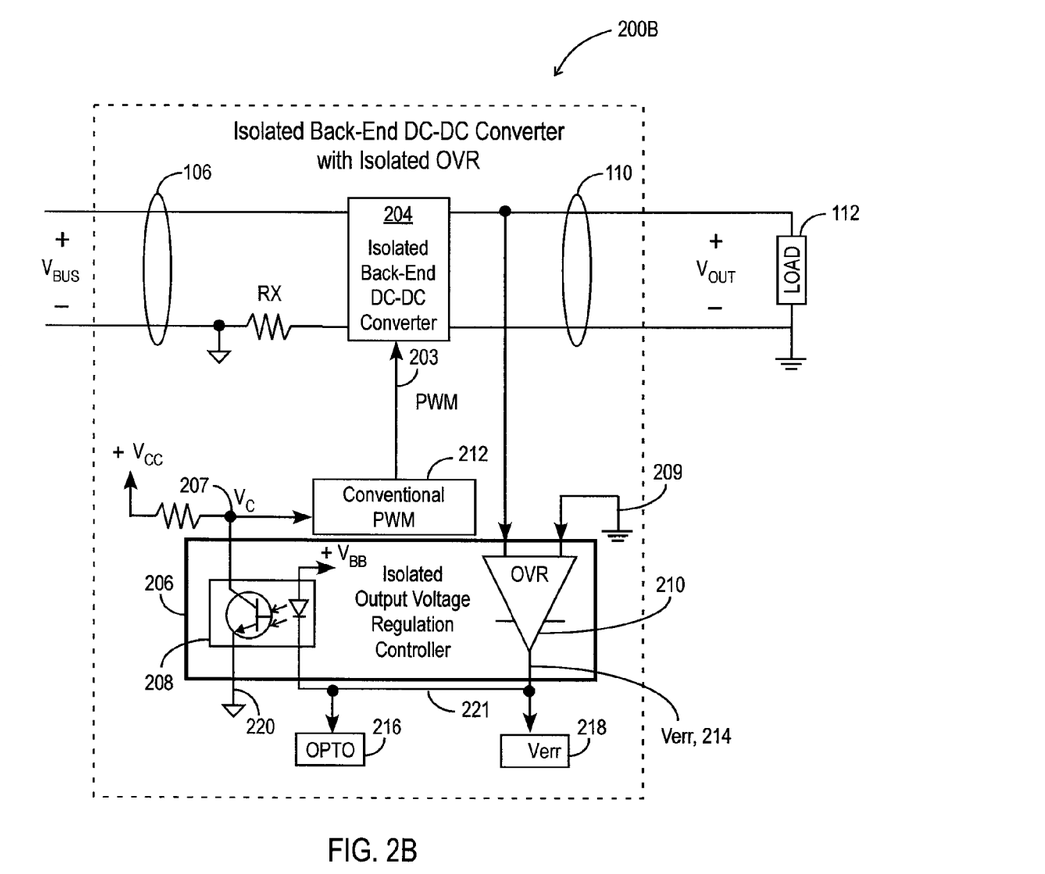

FIGS. 2A-B show typical control block diagrams for back-end converters 200A, 200B. An isolated DC-to-DC power converter stage 204 is controlled by a PWM signal 203. The PWM signal is produced by a PWM modulator such as a current-mode pulse width modulation (PWM) stage 202 (FIG. 2A) or a conventional PWM modulator 212 (FIG. 2B, non-current mode) coupled to an isolated output voltage regulation controller (IOVR) 206.

Shown in FIG. 2A, current-mode PWM modulator has inputs including inputs coupled to the sensed input current terminal 205 of the converter 204 and to an output of the IOVR 207. The conventional PWM modulator, shown in FIG. 2B, has an input coupled to an output of the IOVR 207. The IOVR 206 includes an output voltage regulator OVR 210 and an interconnected isolation device 208 such as an opto-isolator. The opto-isolator is coupled to an input ground 220. The OVR has inputs coupled to $+V_{OUT}$ and a ground 209 and an output 214 coupled to the isolation device. In various embodiments, ground 209 and input ground 220 are electrically isolated. Also coupled to the OVR output are OPTO and Verr nodes 216, 218.

Regulation error voltage Verr 214 is produced by the OVR 210 and is transferred with electrical isolation to the input of the current-mode PWM modulator 207 through the opto-coupler circuit 208. In this manner, the opto-coupler control voltage input node OPTO 216 is connected directly to the error voltage 214. Therefore, the overall AC-to-DC power system is designed for stand-alone applications in which the system load demand must not exceed the power rating of the power system. Attempts to parallel connect multiple power systems, particularly those with conventional PWM, will lead to severely unequal sharing among their channel-output currents. This results in poor system reliability and poor utilization of one or more channels that are not active in their power transfers. Due to the input-output isolation within the back-end converter 204 and the feedback isolation within the opto-coupler 208, the output ground 209 is electrically isolated from the converter's input ground 220 (the power return of DC link voltage $V_{BUS}$).

For power systems having back-end converters with dedicated current-mode PWM control and APFC front-end stages independently sourced by different AC voltages, non-uniform channel output currents exist when the current mode PWM control in each back-end converter fails to directly regulate the converter's output current. This non-uniform channel output current sharing occurs when the intermediate DC-link voltages $V_{BUS\_i}$ differ due to factors including component mismatches and/or differences in rated DC-link voltages of the front-end APFC stages resulting from different design versions, totally different designs, or different manufacturing processes.

Figure 3:
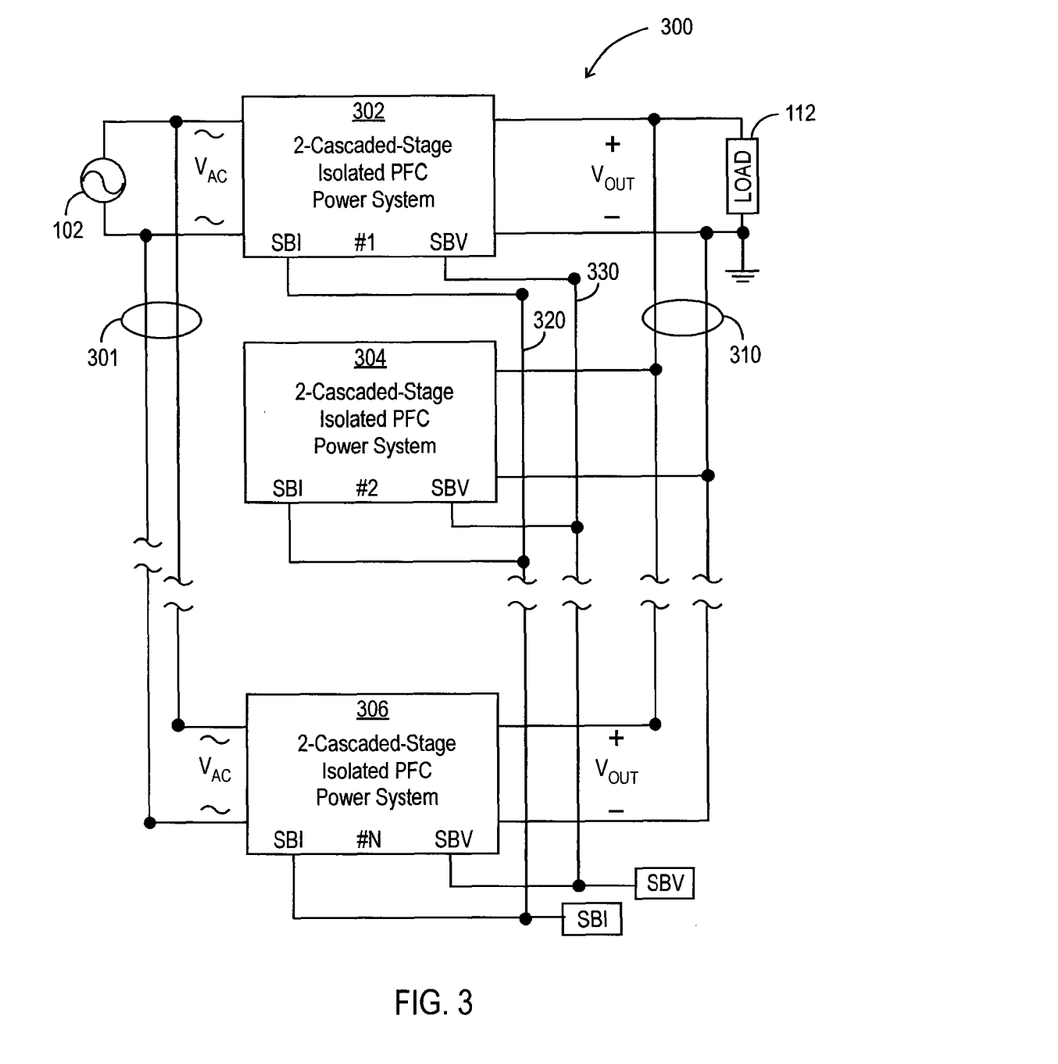
FIG. 3 shows a block diagram of a power system with multiple AC-to-DC power channels in accordance with the present invention.

FIG. 3 shows an embodiment of a parallel-connected AC-to-DC power system 300. The system includes two shared buses, one for current-sharing SBI 320 and another for dominant bus error voltage SBV 330. In an embodiment, power system expansion with current sharing is implemented by interposing a current sharing circuit in the IOVR controller 206 within each back-end converter of each cascaded stage. For example, a plurality of AC-to-DC power channels such as three cascaded stage isolated power factor control ("PFC") power systems 302, 304, 306 may be interconnected by the SBI and SBV buses. As shown here, each power system power input is connected across a common AC source 102 through a common AC bus 301 and each power system power output is connected in parallel through a system output bus 310 across a common load 112.

Figure 4:
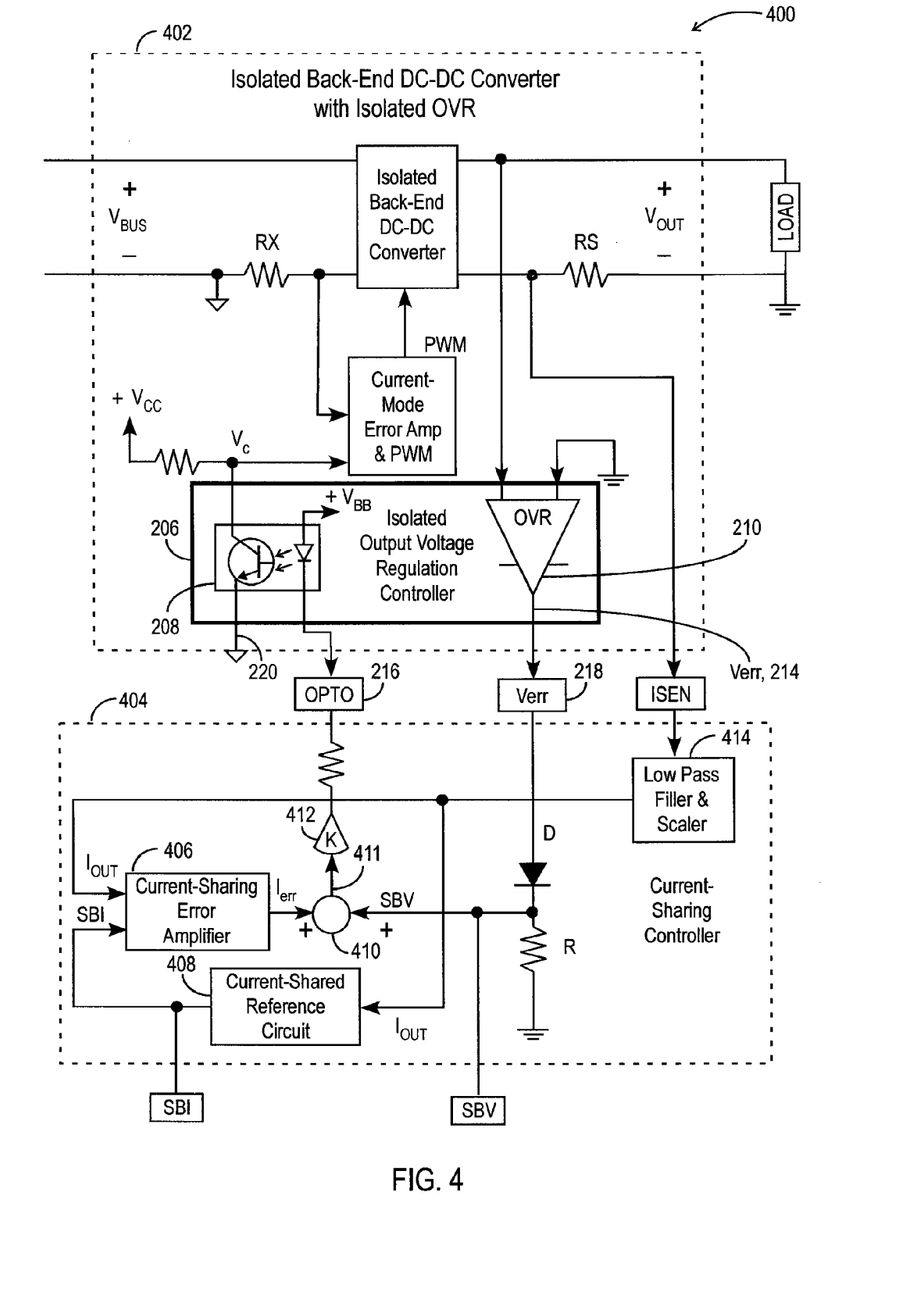
FIG. 4 shows a block diagram of a back end converter and current sharing controller in accordance with the present invention.

In an embodiment, each of the cascaded stages 302, 304, 306 includes back-end converters with current sharing controllers 400 as shown in FIG. 4. In some embodiments, one or more back-end converters 402 have conventional PWM modulators (see FIG. 2B). By breaking the feedback path 221 of the existing IOVR control loop 221 (see FIG. 2B) between the OPTO and Verr nodes 216, 218 (see FIG. 4), the current sharing control circuit 404 can be inserted across the two nodes for providing a control correction such as a minor control correction to the regulation error voltage Verr. This allows regulation of the scaled and low-pass filtered 414 sensed current signal $I_{out}$ to a common shared bus reference current signal at node SBI and at which all SBI nodes belonging to the back-end converters are tied together via the SBI bus 320 as shown in FIG. 3.

Figure 5:
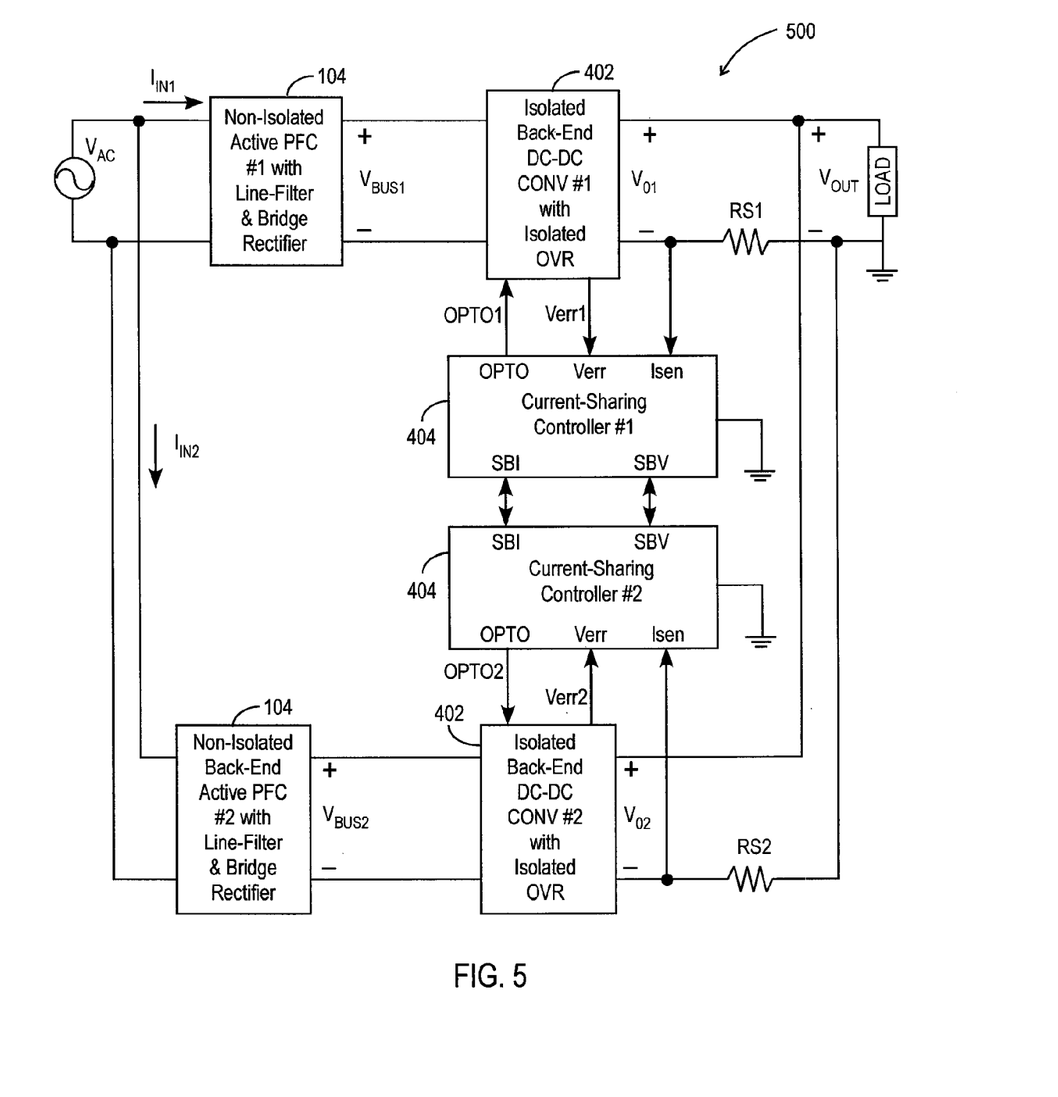
FIG. 5 shows a block diagram of a parallel connected AC-to-DC power system sharing the same load in accordance with the present invention.
Figure 6:
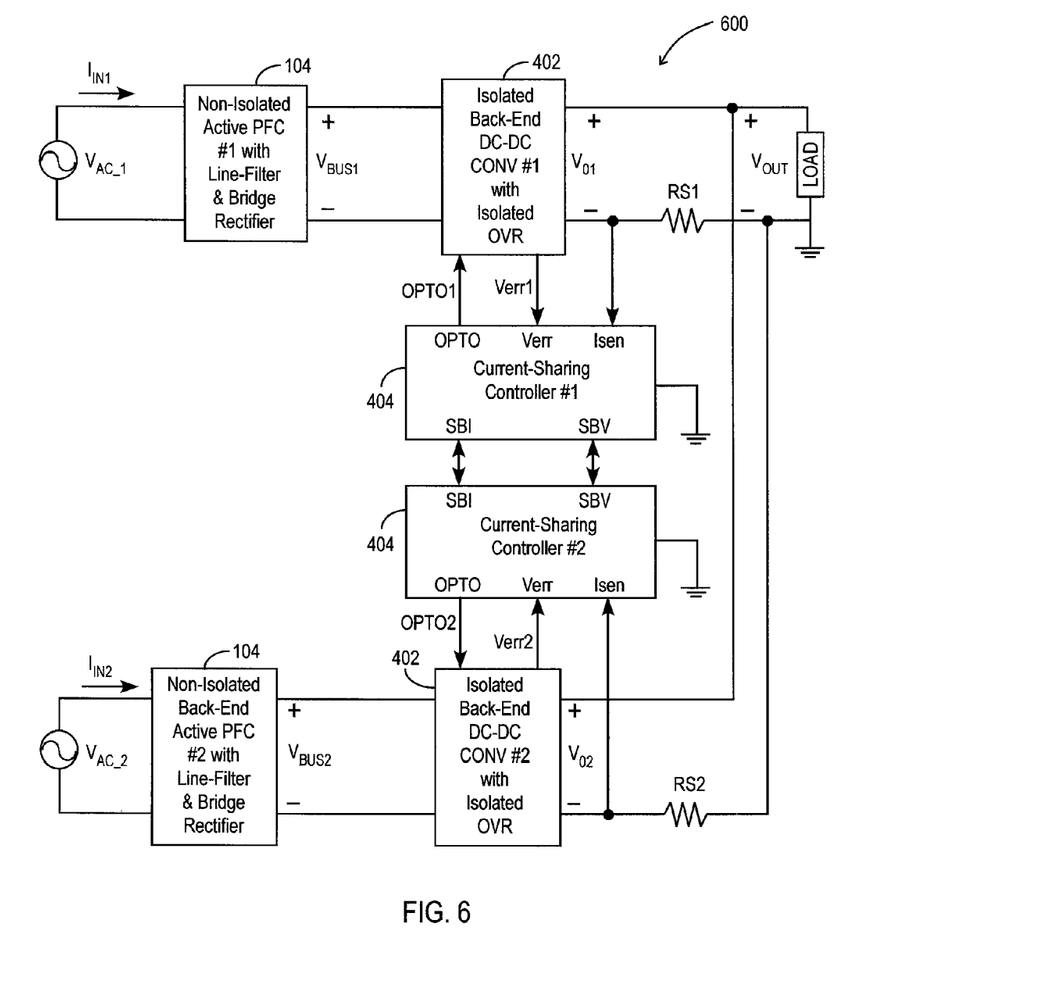
FIG. 6 shows a block diagram of two independently sourced AC-to-DC power systems sharing the same load in accordance with the present invention.

FIG. 5 shows a power system 500 comprising multiple power channels with front-end PFC converters connected in parallel across a common AC supply and back-end converters connected in parallel across a common load 500. FIG. 6 shows a distributed power system 600 comprising multiple power channels with front-end converters connected to independent AC power supplies and back-end converters connected in parallel across a common load 600. Among multiple back-end converters that are connected in parallel at their outputs and have their SBV nodes tied together as shown in FIGS. 5 and 6, the common shared bus error voltage at node SBV always tracks the highest regulation error voltage that is selected by a maximum-limit network with a passive rectifier D and a resistor R within a back-end converter, as shown in FIG. 4.

The error voltage at node SBV becomes the dominant error signal that is used in common for regulating the system output voltage to a value corresponding to the highest reference voltage belonging to the IOVR controller within a back-end converter. In this manner, there is no conflict in regulation of the system output voltage since only one IOVR controller belonging to a back-end converter commonly controls all the paralleled output back-end converters.

Within the current sharing controller 404, a current sharing error amplifier 406 outputs a current error signal $I_{err}$ derived from $I_{out}$ and SBI. A low pass filter and scaler 414 derives $I_{out}$ from $I_{sen}$ and a current shared reference circuit 408 derives SBI from $I_{out}$.

The current sharing error signal Ierr serves as a control correction such as a minor control correction being added by a summer 410 to the primary control signal SBV to form a composite regulation signal 411 that is subsequently scaled or amplified 412 to properly control the opto-coupler circuit 208 in the IOVR controller within the back-end converter 402 through node OPTO 216. In a stand-alone configuration with a single channel AC-to-DC power system, nodes SBI and SBV are floating (not connected externally) and the system output voltage is regulated like the conventional configuration of FIG. 1.

Use of dual shared buses SBI, SBV causes current-sharing performance to be independent from mismatches among the reference voltages and component values that are distributed in the respective IOVR circuits of the back-end converters because all current sharing error signals $Ierr_i$ are independently produced and mixed with the commonly shared OVR error signal SBV. And, because all of the back-end converters are controlled in unison by the same control voltage at the SBV node to continuously regulate the system output voltage corresponding to the dominant reference voltage, the system output voltage regulation is unaffected by the current sharing error signals that are minor corrections for equalizing output currents.

When properly inserted, the current sharing control enables parallel connection of multiple AC-to-DC power systems for service in a single stand-alone power channel for a single AC power source 500 as shown in FIG. 5 and as multiple power channels for uniform power transfers from independent AC power sources that could have different voltages and operating frequencies such as two AC-to-DC power channels for two independent power sources 600 as shown in FIG. 6.

Simulations show power sharing is improved in a two channel power system with two parallel connected AC-to-DC power systems similar to those shown in FIG. 4.

Figure 7A:
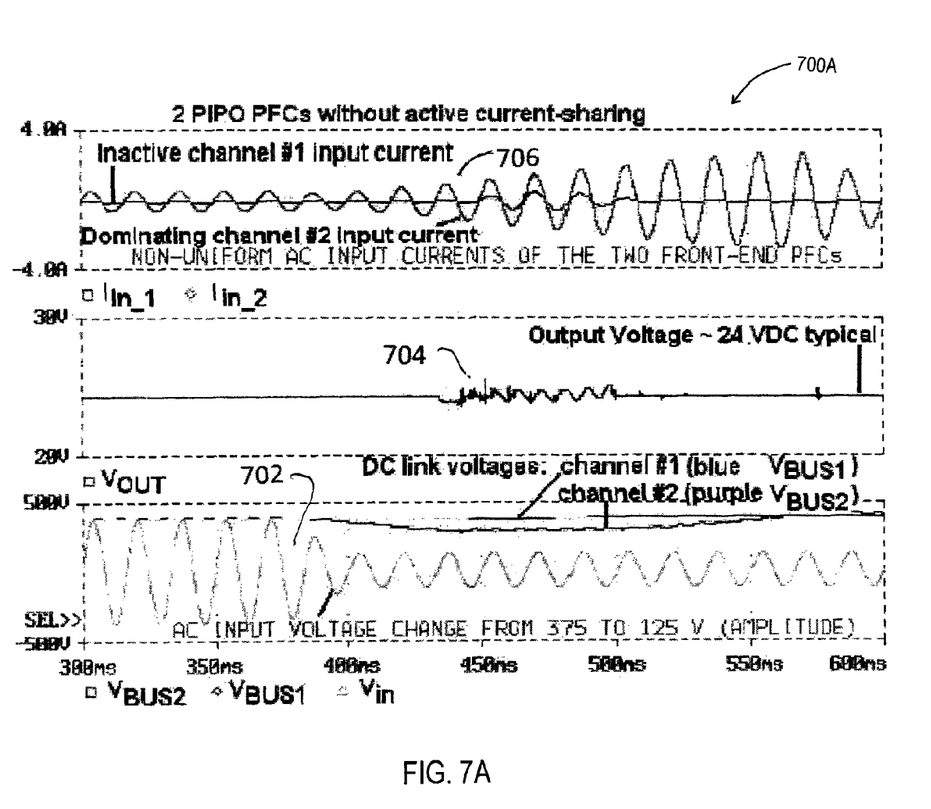
FIGS. 7A-B show oscilloscope traces of a simulated AC-to-DC power system in accordance with the present invention.

FIG. 7A shows the simulation result of two AC-to-DC power channels sharing the same load without active current sharing 700A. Here, the SBI terminals are left floating without tying them together.

An AC-source voltage transition 702 from 375 V to 125 V of its voltage amplitude produces a system response of output voltage 704 and AC input currents 706 without active current-sharing. Current response 706 shows severely mismatched currents between the two AC input channel currents $I_{in\_1}$ and $I_{in\_2}$. Prior to and sufficiently after the AC input voltage transition, the output voltage $V_{OUT}$ 704 indicates good regulation during steady state. Similarly, the DC link voltages of the two power channels $V_{BUS1}$ and $V_{BUS2}$ are also well regulated during steady state. As seen, the input current of power channel 2 $I_{in\_2}$ far exceeds that of power channel 1 $I_{in\_1}$; consequently, the DC link voltage of power channel 2 $V_{BUS2}$ also exhibits more significant transient voltage sag below that of power channel 1, $V_{BUS1}$ before both of them resume their steady state regulation after time t=575 mSec.

Figure 7B:
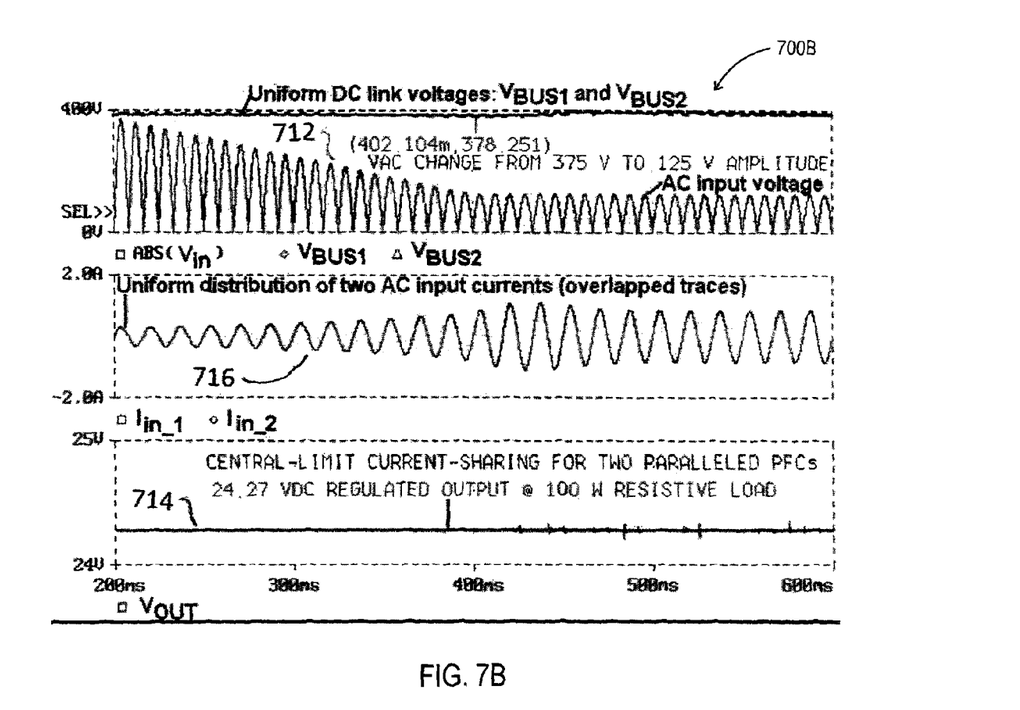

FIG. 7B shows the simulation result of two AC-to-DC power channels sharing the same load with active current sharing 700B. Here, the SBI terminals are interconnected via an SBI shared bus as shown in FIG. 5.

An AC source voltage transition 712 from 375 V to 125 V of its voltage amplitude produces a system response of output voltage 714, and AC input currents 716 with active current-sharing. The channel input currents and $I_{in\_2}$ are uniformly distributed as shown by their overlapping waveforms into a single line 716. The system output voltage 714 remains well regulated despite the amplitude change in the system input voltage.

In an embodiment with an AC power system such as that of FIG. 6, distributed AC power sources of different operating frequencies and different AC voltages supply two power channels. As before, use of the shared SBI bus results in uniform current sharing between the channel output currents despite having two independent AC power sources with different operating frequencies, for example, 50 Hz and 60 Hz.

An experimental prototype of the two channel AC-to-DC converter power system with a configuration similar to that of FIG. 5 was implemented for a single 60-Hz AC source. The prototype employs a current shared bus SBI as the central limit current reference signal to which the sensed channel output current signal of each AC-to-DC power channel is regulated.

Figure 8A:
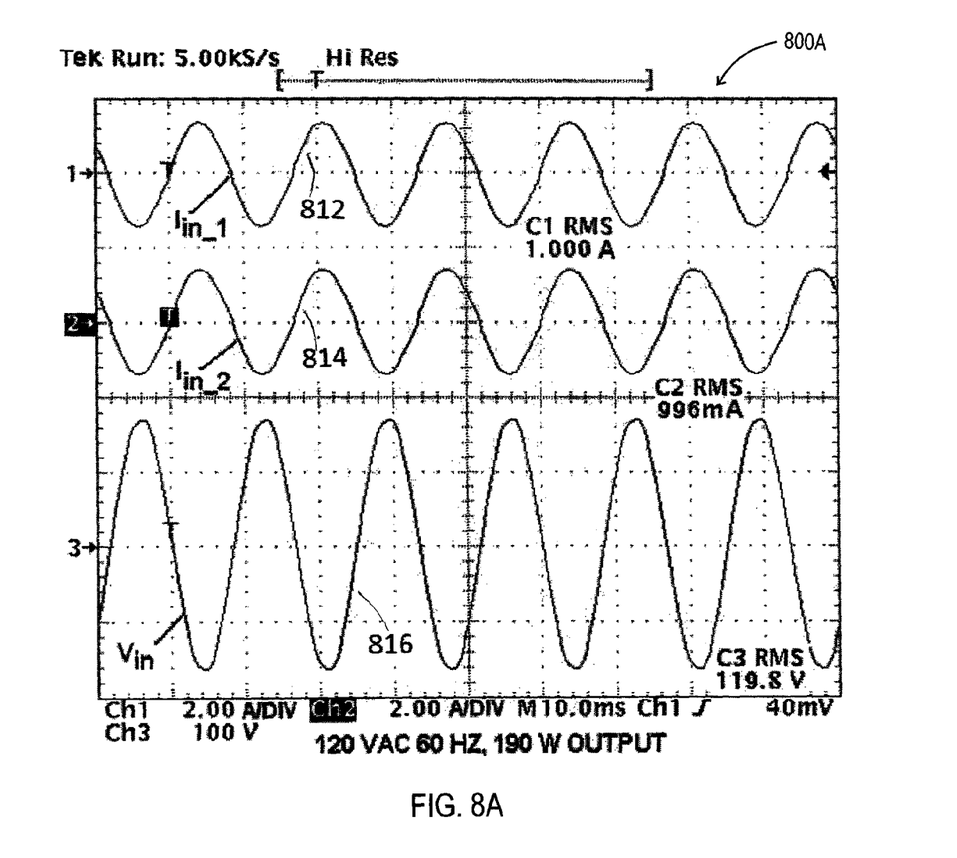
FIGS. 8A-B show oscilloscope traces of prototype performance of an AC-to-DC power system in accordance with the present invention.

FIG. 8A shows the prototype steady state response 800A. The two channel input AC currents 812, 814 are substantially uniformly distributed and their RMS values of 1.000 A and 0.996 A are nearly the same under an input voltage of 119.8 VRMS 816 and an output load of 190 W.

Figure 8B:
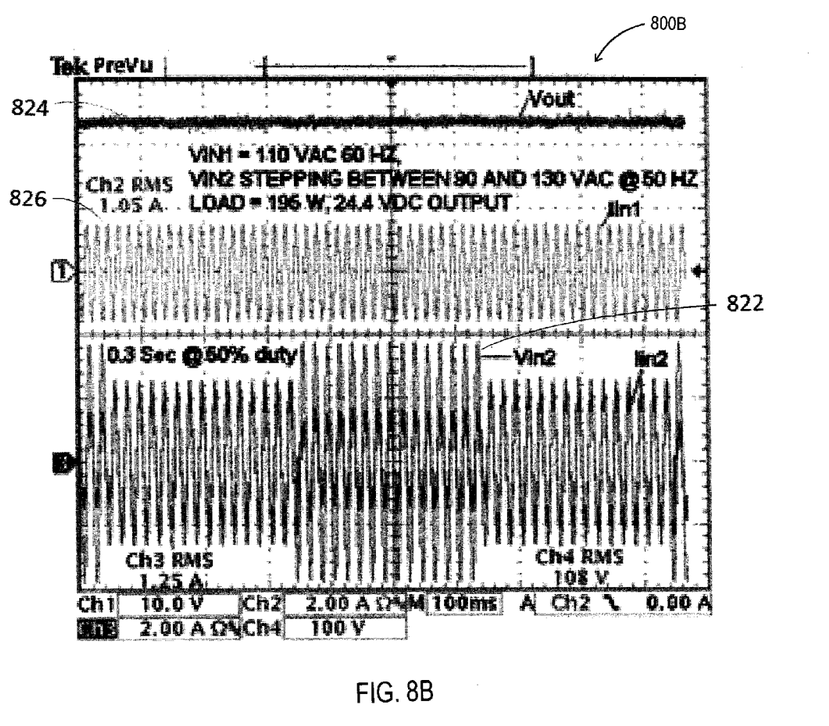

For an independently sourced two channel power system depicted in FIG. 6, FIG. 8B shows the prototype response to a voltage change 800B. Vin2, the AC input voltage of the second power channel 822, has its RMS value stepping between 90 V and 130 V while $V_{OUT}$, the output voltage of the parallel connected DC channel outputs 824, and $I_{in\_1}$, the channel-1 input current 826, remain undisturbed.

Figure 9:
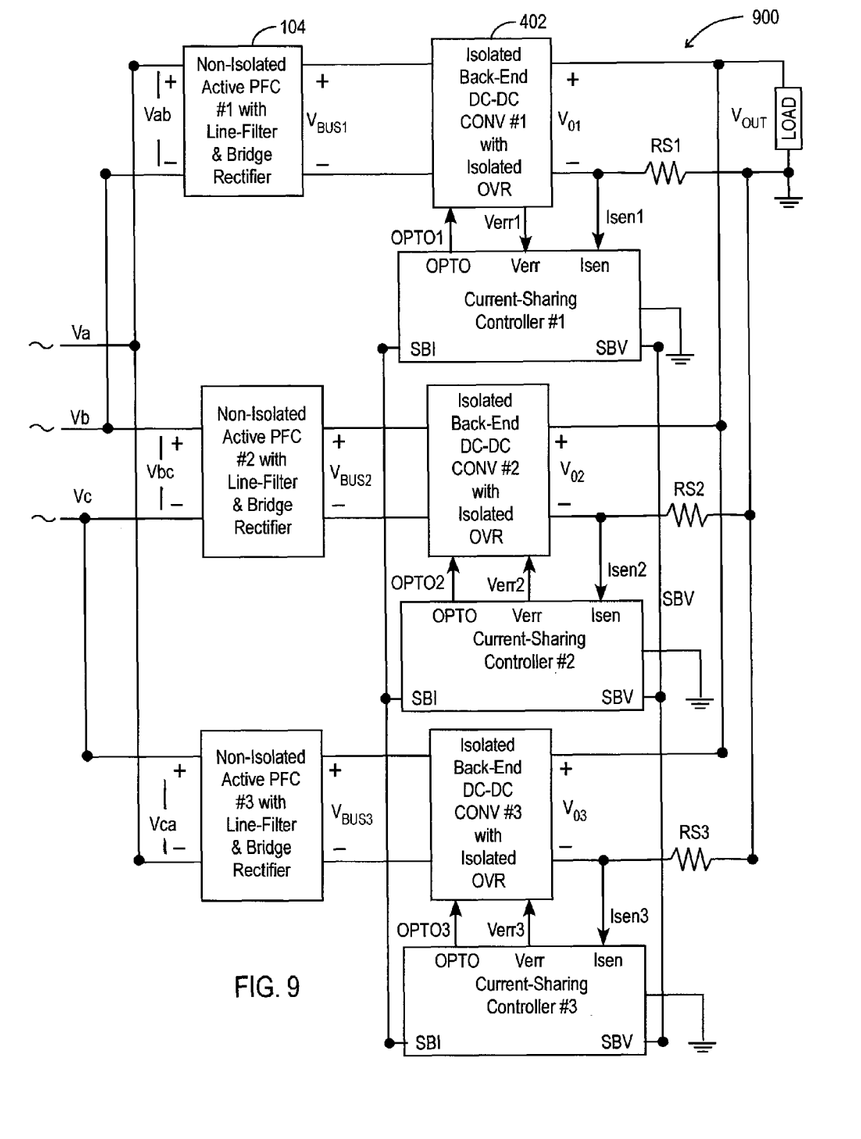
FIG. 9 shows a block diagram of a three channel AC-to-DC power system in accordance with the present invention.

Another embodiment shows balanced currents among the phases of a three phase AC supply. FIG. 9 shows a three phase dual shared bus control scheme 900. As shown, the control scheme is applied to achieve uniform power sharing among three phases of AC input voltages typical of a three phase utility grid. Notably, there is no requirement for 50/60-Hz isolation transformers between the three phase input voltages and the three channel AC-to-DC converter system. These isolation transformers are not needed because the intermediate DC bus voltages $V_{BUS1}$, $V_{BUS2}$ and $V_{BUS3}$ are not only decoupled from one another, but are also isolated from the system output voltage $V_{OUT}$ and the output power ground. Tying current shared buses and voltage shared buses, respectively together ensures proper operation for both the system output voltage regulation and the well balanced three phase currents drawn from the utility grid.

As the simulation and experimental data show, the control schemes for uniform output current sharing for a two-channel AC-to-DC converter power system with active power factor correction are validated. In various embodiments, electrical isolation between input and output of each AC-to-DC converter power channel enables current sharing. And, in various embodiments, the current sharing schemes with dual shared buses operate without causing conflicts in the system output voltage regulation control among parallel connected power channels and current sharing performance is independent from mismatch in internal reference voltages and component values within the output voltage regulation control circuits distributed within respective AC-to-DC converters.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

What is claimed is:

1. An electric power system for balancing the output currents of a plurality of power channels serving a common load, the electric power system comprising:
    a plurality of power channels;
    each power channel including a DC-link coupled between an AC-to-DC converter with power factor correction and an isolated DC-to-DC converter, a PWM modulator, an isolated output voltage regulation controller, and a current sharing controller;
    a power output of each DC-to-DC converter connected in parallel across a common load;
    a voltage signal bus shared by each of the current sharing controllers, said bus operable to share a dominant reference voltage signal of one voltage regulation controller;
    a current signal bus shared by each of the current sharing controllers, said bus operable to share a reference current signal derived from currents sensed at each DC-to-DC converter output; and,
    each current sharing controller having an output derived from the reference current signal, the dominant reference voltage signal, and the current sensed at a respective DC-to-DC converter output, said current sharing controller output being coupled to a respective PWM modulator by an electrically isolated signal path.

2. The electric power system of claim 1 wherein the PWM modulator includes a current mode error amplifier.

3. The electric power system of claim 1 wherein the AC-to-DC converter includes a line filter and a bridge rectifier.

4. A method of balancing the currents in the power channels of a power system serving a common load while regulating output voltage, the method comprising the steps of:
    for each power channel, providing a DC-link coupling an AC-to-DC converter with active power factor correction to an isolated DC-to-DC converter;
    for each DC-to-DC converter, providing an isolated voltage regulation controller coupling a current sharing controller to a PWM modulator, the PWM modulator being coupled to the DC-to-DC converter;
    interconnecting the current sharing controllers with a current signal bus for broadcasting a current reference signal;
    interconnecting the current sharing controllers with a voltage signal bus for broadcasting a dominant voltage reference signal; and,
    the power sharing controllers controlling the power channels for uniform power sharing among the channels with each of the channels providing substantially the same amount of power to the load.

5. The electric power system of claim 4 wherein the PWM modulator includes a current mode error amplifier.

6. The electric power system of claim 4 wherein the AC-to-DC converter includes a line filter and a bridge rectifier.

7. An electric power system for balancing the output currents of a plurality of power channels serving a common load, the electric power system comprising:
    a plurality of power channels, each power channel including
        a front-end AC-to-DC converter with active power factor control coupled to a back-end isolated DC-to-DC converter via a DC-link,
        a PWM modulator interconnected with the DC-to-DC converter,
        a current sensor operable to provide a sensed current signal derived from a DC-to-DC converter output,
        a voltage regulator operable to provide a voltage error signal derived from the DC-to-DC converter output, and
        a current sharing controller;
    the output of each DC-to-DC converter connected in parallel across a common load;
    a voltage signal bus shared by each of the current sharing controllers, said bus operable to share a dominant reference voltage signal derived from a selected voltage error signal;
    a current signal bus shared by each of the current sharing controllers, said bus operable to share a reference current signal derived from the sensed current signals of the current sharing controllers;
    a current error signal derived from the sensed current signal and the reference current signal; and,
    each current sharing controller having an output derived from the current error signal and the dominant reference voltage signal, said output being coupled to a respective PWM modulator by an electrically isolated signal path.

8. The electric power system of claim 7 wherein the PWM modulator includes a current mode error amplifier.

9. The electric power system of claim 7 wherein the AC-to-DC converter includes a line filter and a bridge rectifier.

10. An electric power system for balancing input currents among the phases of a three phase AC supply, the power system comprising:
    three power channels;
    each power channel including a DC-link coupled between an AC-to-DC converter with power factor correction and an isolated DC-to-DC converter, a PWM modulator, an isolated output voltage regulation controller, and a current sharing controller;
    a three phase AC power connection with phases a and b coupled to the input of a first AC-to-DC converter, with phases b and c coupled to the input of a second AC-to-DC converter, and with phases c and a coupled to the input of a third AC-to-DC converter;
    the output of each DC-to-DC converter connected in parallel across a common load;
    a voltage signal bus shared by each of the current sharing controllers, said bus operable to share a dominant reference voltage signal of one voltage regulation controller;
    a current signal bus shared by each of the current sharing controllers, said bus operable to share a reference current signal derived from currents sensed at each DC-to-DC converter output; and,
    each current sharing controller having an output derived from the reference current signal, the dominant reference voltage signal, and the current sensed at a respective DC-to-DC converter output, said current sharing controller output being coupled to a respective PWM modulator by an electrically isolated signal path.

11. The electric power system of claim 10 wherein the PWM modulator includes a current mode error amplifier.

12. The electric power system of claim 10 wherein the AC-to-DC converter includes a line filter and a bridge rectifier.

13. An electric power system comprising:
- a plurality of power channels with DC outputs serving a common load, each power channel having a front-end and a back-end;
- each back-end having an isolated DC-to-DC converter;
- together, the isolated DC-to-DC converters operable to isolate corresponding front-end AC inputs from the DC outputs;
- a PWM modulator corresponding to each DC-to-DC converter;
- the PWM modulator configured to vary a DC-to-DC converter power output in accordance with a hybrid control signal;
- a voltage signal bus and a current signal bus;
- the hybrid control signal derived at least in part from signals transported by the voltage signal bus and the current signal bus;
- the power system operable to actively balance currents among the power channels; and,
- the power system operable to actively control voltage across the common load.

* * * * *